(12) United States Patent
Fan et al.

(10) Patent No.: US 11,153,918 B2
(45) Date of Patent: *Oct. 19, 2021

(54) RANDOM ACCESS CHANNEL RESPONSE HANDLING WITH AGGREGATED COMPONENT CARRIERS

(71) Applicant: Conversant Wireless Licensing S.a r.l., Luxembourg (LU)

(72) Inventors: Jianke Fan, Espoo (FI); Juha S. Korhonen, Espoo (FI); Mikko J. Rinne, Espoo (FI); Esa M. Malkamaki, Espoo (FI)

(73) Assignee: Conversant Wireless Licensing S.a r.l., Luxembourg (LU)

( * ) Notice: Subject to any disclaimer, the term of this patent is extended or adjusted under 35 U.S.C. 154(b) by 0 days.

This patent is subject to a terminal disclaimer.

(21) Appl. No.: 16/909,062

(22) Filed: Jun. 23, 2020

(65) Prior Publication Data

US 2020/0374936 A1 Nov. 26, 2020

Related U.S. Application Data

(60) Continuation of application No. 15/903,855, filed on Feb. 23, 2018, now Pat. No. 10,757,737, which is a continuation of application No. 14/976,154, filed on Dec. 21, 2015, now Pat. No. 9,930,697, which is a continuation of application No. 13/248,579, filed on Sep. 29, 2011, now Pat. No. 9,253,797, which is a division of application No. 12/384,950, filed on Apr. 10, 2009, now Pat. No. 8,077,670.

(51) Int. Cl.
*H04W 74/08* (2009.01)
*H04W 74/00* (2009.01)
*H04W 72/04* (2009.01)
*H04L 5/00* (2006.01)

(52) U.S. Cl.
CPC ... *H04W 74/0833* (2013.01); *H04W 72/0453* (2013.01); *H04W 74/002* (2013.01); *H04L 5/0044* (2013.01)

(58) Field of Classification Search
CPC . H04W 74/002; H04W 74/0833; H04W 8/26; H04W 74/08; H04W 74/004; H04L 27/2607
See application file for complete search history.

(56) References Cited

U.S. PATENT DOCUMENTS

2010/0331003 A1* 12/2010 Park ............... H04W 74/0866
455/450

* cited by examiner

*Primary Examiner* — Iqbal Zaidi
(74) *Attorney, Agent, or Firm* — Conversant IP Management Corp.

(57) ABSTRACT

Disclosed herein are methods, computer program instructions and apparatus for performing random access procedures in a wireless communication system. A method includes receiving at a network access node, in different time and frequency resources that are allocated for preamble transmission, and in different ones of a plurality of component carriers, a plurality of random access requests from individual ones of a plurality of user equipments; and transmitting a corresponding plurality of random access responses in a time and frequency resource of a single component carrier.

9 Claims, 10 Drawing Sheets

RANDOM ACCESS CHANNEL RESPONSE HANDLING WITH AGGREGATED COMPONENT CARRIERS

CROSS-REFERENCE TO RELATED APPLICATIONS

The present application is a continuation of application Ser. No. 15/903,855 filed Feb. 23, 2018, which in turn is a continuation of Ser. No. 14/976,154, filed Dec. 21, 2015 now U.S. Pat. No. 9,930,697, which in turn is a continuation application of Ser. No. 13/248,579, filed Sep. 29, 2011 now U.S. Pat. No. 9,253,797, which in turn is a divisional of application Ser. No. 12/384,950, filed Apr. 10, 2009, now U.S. Pat. No. 8,077,670. The disclosures of all of the above applications are hereby incorporated herein in their entirety by reference.

TECHNICAL FIELD

The exemplary and non-limiting embodiments of this invention relate generally to wireless communication systems, methods, devices and computer programs and, more specifically, relate to random access channel signaling techniques between a mobile node and a network access node.

BACKGROUND

This section is intended to provide a background or context to the invention that is recited in the claims. The description herein may include concepts that could be pursued, but are not necessarily ones that have been previously conceived, implemented or described. Therefore, unless otherwise indicated herein, what is described in this section is not prior art to the description and claims in this application and is not admitted to be prior art by inclusion in this section.

The following abbreviations that may be found in the specification and/or the drawing figures are defined as follows:

3GPP third generation partnership project
DL downlink (eNB towards UE)
DwPTS downlink pilot time slot
eNB EUTRAN Node B (evolved Node B)
EPC evolved packet core
EUTRAN evolved UTRAN (LTE)
FDD frequency division duplex
FDMA frequency division multiple access
GP guard period
LTE long term evolution
MAC medium access control
MM/MME mobility management/mobility management entity
Node B base station
OFDMA orthogonal frequency division multiple access
O&M operations and maintenance
PDCP packet data convergence protocol
PDCCH physical downlink control channel
PDSCH physical downlink shared channel
PHY physical (layer 1)
PRACH physical random access channel
RA-RNTI random access radio network temporary identity
RACH random access channel
RLC radio link control
RRC radio resource control
SGW serving gateway
SC-FDMA single carrier, frequency division multiple access
TDD time division duplex
T-CRNTI temporary cell random access radio network temporary identity
TTI transmission timing interval
UE user equipment
UL uplink (UE towards eNB)
UpPTS uplink pilot time slot
UTRAN universal terrestrial radio access network The specification of a communication system known as evolved UTRAN (EUTRAN, also referred to as UTRANLTE or as EUTRA) is currently nearing completion within the 3GPP. As specified the DL access technique is OFDMA, and the UL access technique is SC-FDMA.

One specification of interest is 3GPP TS 36.300, V8.7.0 (2008-12), 3rd Generation Partnership Project; Technical Specification Group Radio Access Network; Evolved Universal Terrestrial Radio Access (EUTRA) and Evolved Universal Terrestrial Access Network (EUTRAN); Overall description; Stage 2 (Release 8), incorporated by reference herein in its entirety. This system may be referred to for convenience as LTE Rel-8, or simply as Rel-8. In general, the set of specifications given generally as 3GPP TS 36.xyz (e.g., 36.211, 36.311, 36.312, etc.) may be seen as describing the entire Release 8 LTE system.

FIG. 1A reproduces FIG. 4.1 of 3GPP TS 36.300, and shows the overall architecture of the EUTRAN system. The EUTRAN system includes eNBs, providing the EUTRA user plane (PDCP/RLC/MAC/PHY) and control plane (RRC) protocol terminations towards the UE. The eNBs are interconnected with each other by means of an X2 interface. The eNBs are also connected by means of an S1 interface to an EPC, more specifically to a MME (Mobility Management Entity) by means of a S1 MME interface and to a Serving Gateway (SGW) by means of a S1 interface. The S1 interface supports a many to many relationship between MMEs/Serving Gateways and eNBs.

The eNB hosts the following functions:

functions for Radio Resource Management: Radio Bearer Control, Radio Admission Control, Connection Mobility Control, Dynamic allocation of resources to UEs in both uplink and downlink (scheduling);

IP header compression and encryption of the user data stream; selection of a MME at UE attachment;

routing of User Plane data towards Serving Gateway;

scheduling and transmission of paging messages (originated from the MME);

scheduling and transmission of broadcast information (originated from the MME or O&M); and a measurement and a measurement reporting configuration for use in mobility and scheduling.

In the present LTE system preamble responses are sent utilizing both the PDCCH and the PDSCH. Each RACH resource (time and frequency resource reserved for preamble transmission) is associated with a RA-RNTI (random access radio network temporary identity). When the base station (eNB) observes a preamble, it transmits the preamble response on the PDSCH on a resource that is indicated by a PDCCH addressed with the RA-RNTI. More specifically, when a Random Access Response message is transmitted, the CRC word of the corresponding PDCCH is masked by RA-RNTI. When searching a preamble response the UE tries to find a RA-RNTI masking corresponding to the frequency and time resource that the UE had used when sending its preamble. In this manner the preamble response on the PDSCH is unambiguously associated with preambles transmitted on a certain time-frequency resource.

The system is flexible in the sense that the base station can acknowledge in the same PDSCH message several preambles that have been transmitted in the same RACH resource, but that carry different signatures (preamble sequences). In addition, the responses can be sent in a time window that is configurable up to a duration of 10 ms.

In the present LTE system the responses to a set of UEs that listen to the same RA-RNTI can be combined into the same message. However, responses corresponding to different RA-RNTI cannot be combined, and PDCCH and PDSCH messages must be sent separately for each RA-RNTI (i.e., each RACH time-frequency resource). Considering the limited PDCCH resources this is not an efficient procedure. Because the base station does not know the channel state of the UEs, a PDCCH entry for a preamble response must be heavily coded, which consumes significant PDCCH resources. This can lead to problems, especially in the TDD system of LTE where several PRACH resources can exist in one subframe, and where random access responses cannot be distributed in time as flexibly as in the FDD system. This is true at least for the reason that in the TDD system there are gaps in the PDCCH due to subframes reserved for UL.

One LTE specification of interest herein is 3GPP TS 36.211 V8.5.0 (2008-12) Technical Specification 3rd Generation Partnership Project; Technical Specification Group Radio Access Network; Evolved Universal Terrestrial. Radio Access (E-UTRA); Physical channels and modulation (Release 8). As is stated in subclause 4.2, the frame structure type 2 is applicable to TDD.

The PRACH is described in subclause 5.7 of 3GPP TS 36.211 V8.5.0.

Another LTE specification of interest herein is 3GPP TS 36.321 V8.5.0 (2009-03) Technical Specification 3rd Generation Partnership Project; Technical Specification Group Radio Access Network; Evolved Universal Terrestrial Radio Access (EUTRA); Medium Access Control (MAC) protocol definition (Release 8). The specification describes in subclause 5.1 the overall Random Access procedure followed by the UE, in subclause 5.1.3 the Random Access Preamble transmission, and in subclause 5.1.4 the Random Access Response reception.

For example, as currently specified for Rel-8 in subclause 5.1.4 "Random Access Response reception", once the Random Access Preamble is transmitted and regardless of the possible occurrence of a measurement gap, the UE shall monitor the PDCCH for Random Access Response(s) identified by the RA-RNTI defined below, in the RA Response window which starts at the subframe that contains the end of the preamble transmission plus three subframes and has length ra-ResponseWindowSize subframes. The RA-RNTI associated with the PRACH in which the Random Access Preamble is transmitted, is computed as:

RA-RNTI=1+t_id+10*f_id, where t_id is the index of the first subframe of the specified PRACH (0≤t_id<10), and f_id is the index of the specified PRACH within that subframe, in ascending order of frequency domain (0≤f_id<6). The UE may stop monitoring for Random Access Response(s) after successful reception of a Random Access Response containing Random Access Preamble identifiers that matches the transmitted Random Access Preamble.

It is further specified in subclause 5.1.4 that if a downlink assignment for this TTI has been received on the PDCCH for the RA-RNTI, and the received TB is successfully decoded, the UE shall regardless of the possible occurrence of a measurement gap: if the Random Access Response contains a Backoff Indicator subheader:
    set the backoff parameter value in the UE as indicated by the BI field of the Backoff Indicator subheader and Table 7.2-1,
    else, set the backoff parameter value in the UE to 0 ms.
If the Random Access Response contains a Random Access Preamble identifier corresponding to the transmitted Random Access Preamble (see subclause 5.1.3), the UE shall consider this Random Access Response reception successful and process the received Timing Advance Command (see subclause 5.2) and indicate the preambleInitialReceivedTargetPower and the amount of power ramping applied to the latest preamble transmission to lower layers
    (i.e., (PREAMBLE_TRANSMISSION_COUNTER−1) *powerRampingStep);
process the received UL grant value and indicate it to the lower layers; if ra-PreambleIndex was explicitly signaled and it was not 000000 (i.e., not selected by MAC) consider the Random Access procedure successfully completed.

If no Random Access Response is received within the RA Response window, or if none of all received Random Access Responses contains a Random Access Preamble identifier corresponding to the transmitted Random Access Preamble, the Random Access Response reception is considered not successful and the UE shall, among other activities, if in this Random Access procedure the Random Access Preamble was selected by MAC: based on the backoff parameter in the UE, select a random backoff time according to a uniform distribution between 0 and the Backoff Parameter Value; delay the subsequent Random Access transmission by the backoff time; and proceed to the selection of a Random Access Resource (see subclause 5.1.2).

Of particular interest herein are the further releases of 3GPP LTE targeted towards future IMT-A systems, referred to herein for convenience simply as LTE-Advanced (LTE-A).

Reference can be made to 3GPP TR 36.913, V8.0.1 (2009-03), 3rd Generation Partnership Project; Technical Specification Group Radio Access Network; Requirements for Further Advancements for E-UTRA (LTE-Advanced) (Release 8), incorporated by reference herein in its entirety. One element of the LTE-A system is the proposed use of the UHF band (698-960 MHz, referred to simply as 900 MHz) and a 2.3 GHz band (referred to simply as 2 GHz).

SUMMARY

The foregoing and other problems are overcome, and other advantages are realized, by the use of the exemplary embodiments of this invention.

In a first aspect thereof the exemplary embodiments of this invention provide a method that comprises receiving at a network access node, in different time and frequency resources that are allocated for preamble transmission, and in different ones of a plurality of component carriers, a plurality of random access requests from individual ones of a plurality of user equipments; and transmitting a corresponding plurality of random access responses in a time and frequency resource of a single component carrier.

In another aspect thereof the exemplary embodiments of this invention provide an apparatus that comprises a controller configured to operate with a wireless receiver and a wireless transmitter. The controller is further configured to respond to a reception in different time and frequency resources that are allocated for preamble transmission, and in different ones of a plurality of component carriers, a plurality of random access requests from individual ones of a plurality of user equipments and to transmit a corresponding plurality of random access responses in a time and frequency resource of a single component carrier.

In yet another aspect thereof the exemplary embodiments of this invention provide a method that comprises receiving at a network access node, in a time and frequency resource associated with a first frequency band, a random access request from a user equipment; and transmitting a corresponding random access response in a time and frequency resource associated with a second frequency band.

In yet another aspect thereof the exemplary embodiments of this invention provide a method that comprises transmitting to a network access node, in a time and frequency resource of one of a plurality of component carriers, a random access request; and receiving a random access response that is aggregated with other random access responses in a time and frequency resource of the same or a different component carrier.

In yet another aspect thereof the exemplary embodiments of this invention provide an apparatus that comprises a controller configured to operate with a wireless receiver and a wireless transmitter, where the controller is further configured to transmit to a network access node in a time and frequency resource allocated for preamble transmission, of one of a plurality of component carriers, a random access request, and to receive a random access response that is aggregated with other random access responses in a time and frequency resource of the same or a different component carrier.

BRIEF DESCRIPTION OF THE DRAWINGS

In the attached Drawing Figures:

FIG. 1 C reproduces FIGS. 4.2-1 of 3GPP TS 36.211 V8.5.0, and shows the frame structure type 2.

FIGS. 1 D-1 G reproduce FIGS. 6.1.5-1 through 6.1.5-4 of 3GPP TS 36.321 V8.5.0, and show the E/T/RAPID MAC subheader, the E/T/R/R/BI MAC subheader, the MAC RAR and an example of a MAC PDU containing a MAC header and MAC RARs, respectively.

DETAILED DESCRIPTION

References herein to a Rel-8 UE generally encompass those UEs that are compatible with the set of LTE Rel-8 specifications, including 3GPP TS 36.211 V8.5.0 and 3GPP TS 36.321 V8.5.0. References herein to a Rel-9 UE generally encompass those UEs that are generally compatible with the set of LTE Rel-8 specifications, including 3GPP TS 36.211 V8.5.0 and 3GPP TS 36.321 V8.5.0, but that may include additional functionality that is not expressly specified for Rel-8 operation. References herein to an LTE-A UE generally encompass those UEs that may be considered as beyond Rel-8 or Rel-9 UEs.

Figure 1A:
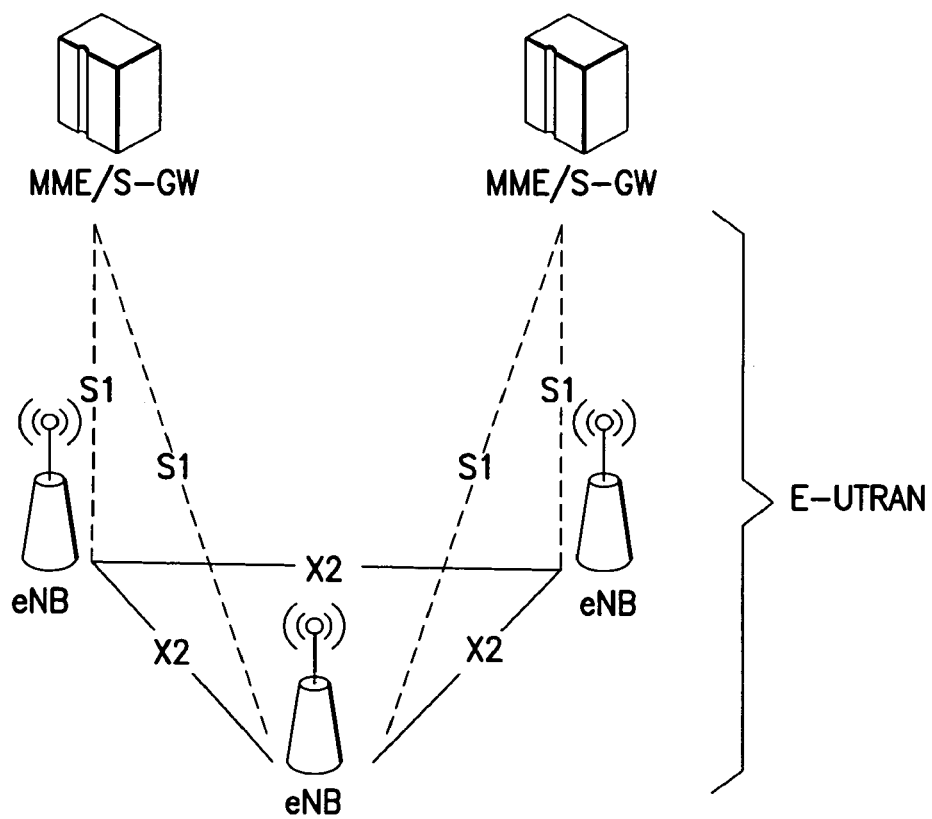
FIG. 1A reproduces FIG. 4 of 3GPP TS 36.300 V 8.7.0, and shows the overall architecture of the EUTRAN system.
Figure 1B:
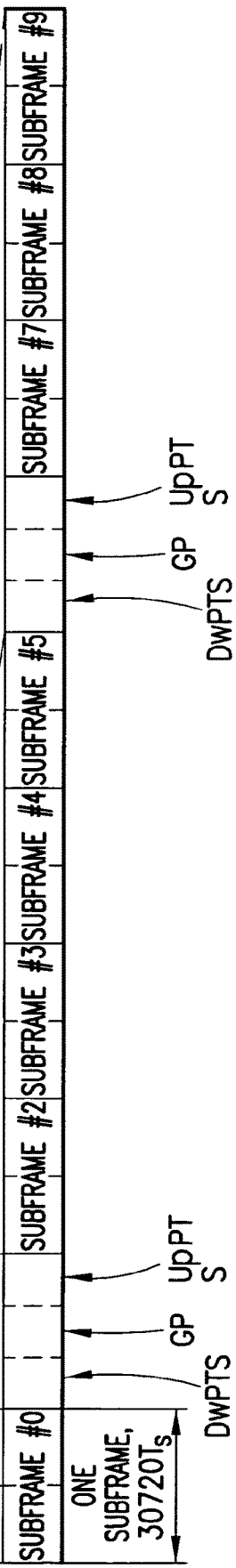
FIG. 1 B reproduces Table 4.2-2 of 3GPP TS 36.211 V8.5.0: Uplink-downlink configurations for the frame structure type 2.
Figure 1C:
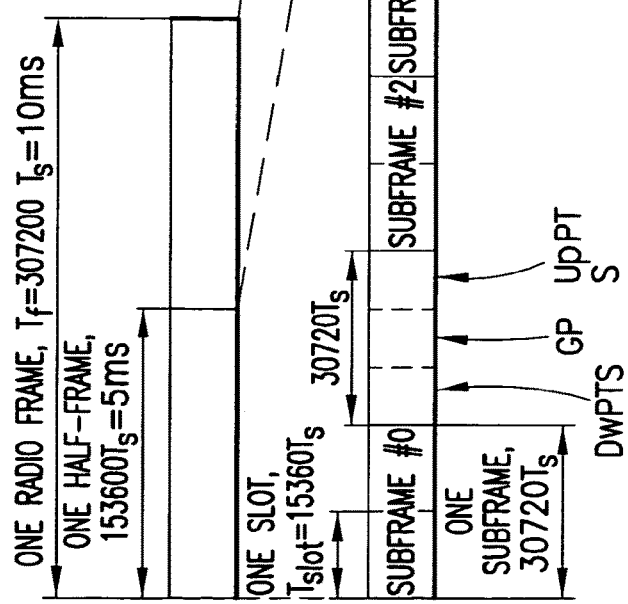
Figure 1D:
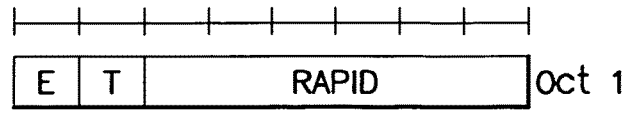
Figure 1E:
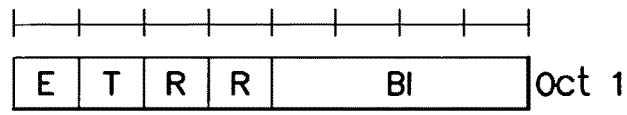
Figure 3:
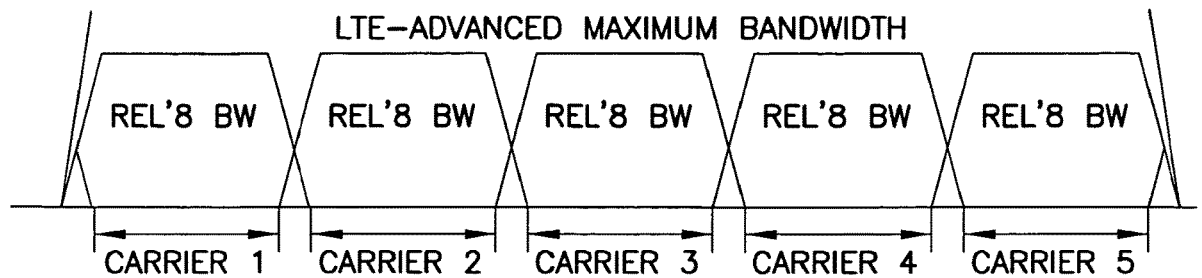
FIG. 3 depicts a contiguous configuration of component carriers.
Figure 4:
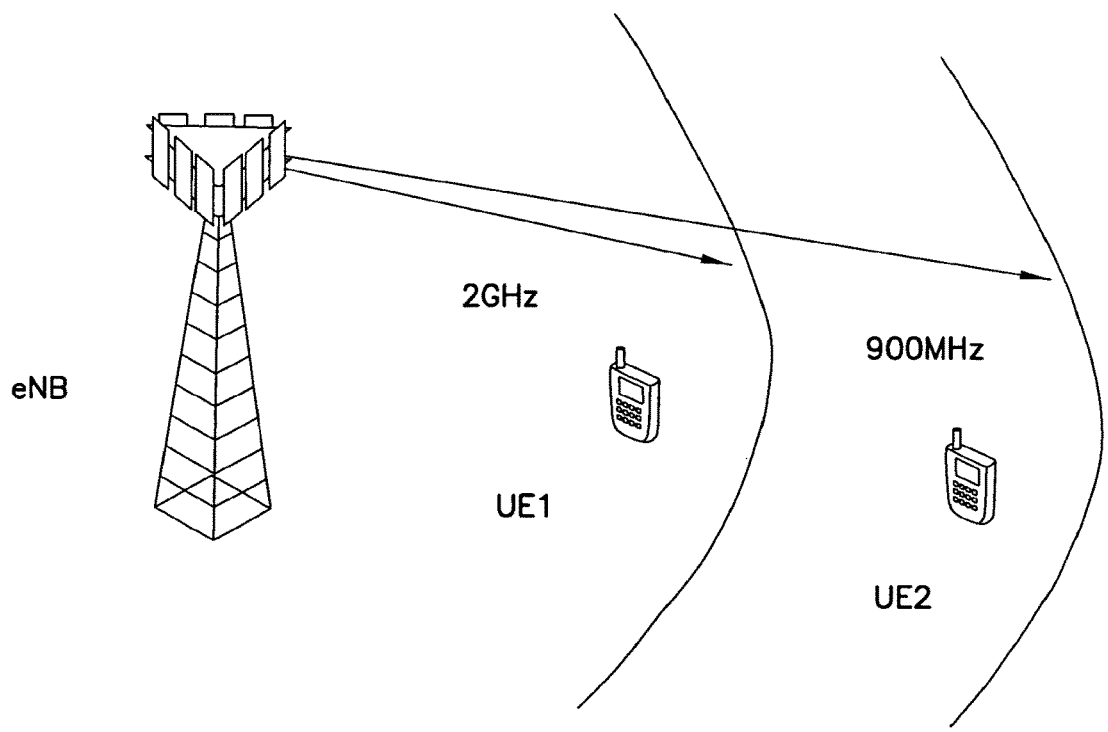
FIG. 4 shows an eNB operable with two UEs of different capability in a non-contiguous carrier aggregation network.
Figure 5:
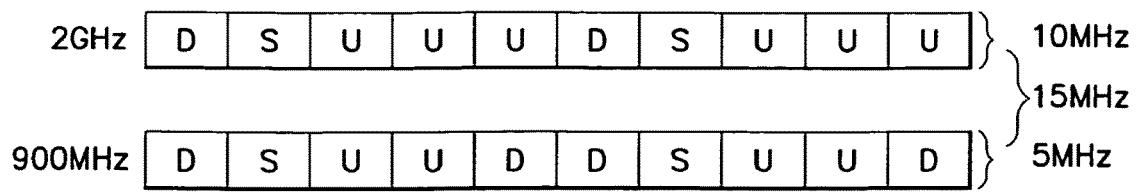
FIG. 5 shows an exemplary TDD CC configuration.

In LTE-A it is proposed that the total system bandwidth may have from two to five component carriers (CCs). These CCs can be contiguous as shown in FIG. 3, where there are five CCs shown each having the Rel-8 bandwidth, or non-contiguous as shown in FIGS. 4 and 5 (note in FIGS. 4 and 5 that the CCs are from two separated bands, e.g., one bandwidth of 10 MHz is from 2 GHz and another bandwidth of 5 MHz is from 900 MHz and, in total, the bandwidth of the two CCs is 15 MHz, and are non-contiguous). At least in the case of non-contiguous carriers, the TDD UL/DL configurations may be different in the different carriers, as is shown more particularly in FIG. 5. In FIGS. 4 and 5 "D" indicates a downlink subframe, "U" indicates an uplink subframe, and "S" indicates a special subframe (see, generally 3GPP TS 36.211 V8.5.0, subclause 4.2 "Frame structure type 2"). FIG. 1B herein reproduces Table 4.2-2 of 3GPP TS 36.211 V8.5.0: Uplink-downlink configurations for the frame structure type 2. FIG. 1C reproduces FIGS. 4.2-1 3GPP TS 36.211 V8.5.0, and shows the frame structure type 2. The special subframe S has three fields: DwPTS, GP and UpPTS. The length of DwPTS and UpPTS is given by Table 4.2-1 of 3GPP TS 36.211 V8.5.0, subject to the total length of DwPTS, GP and UpPTS being equal to $30720 \cdot T_s = 1$ ms. Each subframe i is defined as two slots, 2i and 2i+1 of length $T_{slot} = 15360 \cdot T_s = 0.5$ ms in each subframe. Uplink-downlink configurations with both 5 ms and 10 ms downlink-to-uplink switch-point periodicity are supported. In the case of 5 ms downlink-to-uplink switch-point periodicity, the special subframe S exists in both half-frames. In the case of 10 ms downlink-to-uplink switch-point periodicity, the special subframe S exists in the first half-frame only. Subframes 0 and 5 and DwPTS are always reserved for downlink transmission. UpPTS and the subframe immediately following the special subframe are always reserved for uplink transmission.

In the first step of a Random Access (RA) procedure, the UE selects a CC and transmits a preamble sequence on that CC using a frequency and time resource reserved for preambles. The UE then searches for a preamble response indicating that the base station has observed the preamble and that the UE is allowed to continue the RA procedure.

The exemplary embodiments of this invention provide an efficient technique for the signaling of the preamble responses over aggregated carriers.

A straightforward generalization of the RA procedure for LTE-A with more than one CC would be such that preambles, observed on different CCs, are acknowledged separately by the base station (e.g., by the eNB). That is, when a preamble is observed in the UL of a CC, the acknowledgment is sent in the DL of the same CC (for TDD) or in the DL CC paired with the UL CC (for FDD). While this may be the simplest approach, it does not provide a most efficient and flexible system for at least the following reasons.

Note first that in the FDD case there are pairs of UL and DL carriers, and the response is sent in the paired DL carrier. However, for LTE-A this is not necessarily the case, as there may be more or fewer UL carriers than DL carriers. Furthermore, even when there are an equal number of UL and DL carriers available, a specific UE may be allocated only a part of those carriers (possibly a different number in UL and DL). For example, for LTE-A one of the DL component carriers could be considered as a primary component carrier and random access responses could be sent via this one component carrier only, whereas the random access request could be sent via any available UL component carrier.

As a first reason, PDCCH resources are not used efficiently since a PDCCH entry is needed per each carrier with an observed preamble.

Second, the use of this technique may result in a delay if the preamble response must be postponed by the eNB due to a lack of PDCCH resources.

Third, PDSCH resources are not utilized in the most efficient manner because many small response messages are sent instead of one larger message.

Furthermore, there is little or no flexibility in selecting a most suitable CC for sending the RA response. For example, the base station (eNB) may be forced to send the response in a CC having few DL sub-frames (it may be assumed that UL/DL configurations can be different at least in the case of non-contiguous CC configurations), or in a CC with a large PDCCH load due to a large number of UEs to schedule.

In addition, the foregoing approach does not support a system where all of the RA preambles would be acknowledged in a primary CC that all of the UEs would be listening to. That is, even if the preamble would be sent on another CC (in order to distribute the RA load) the UEs would never need to listen to more than one CC in the DL. The use of the conventional approach would assume having to resume listening to the CC paired with the UL carrier on which the preamble has been sent (when expecting a preamble response), or receiving from more than one CC.

An efficient and flexible system for carrying preamble responses is thus needed for with the use of multiple CCs, such as in LTE-A.

Figure 2A:
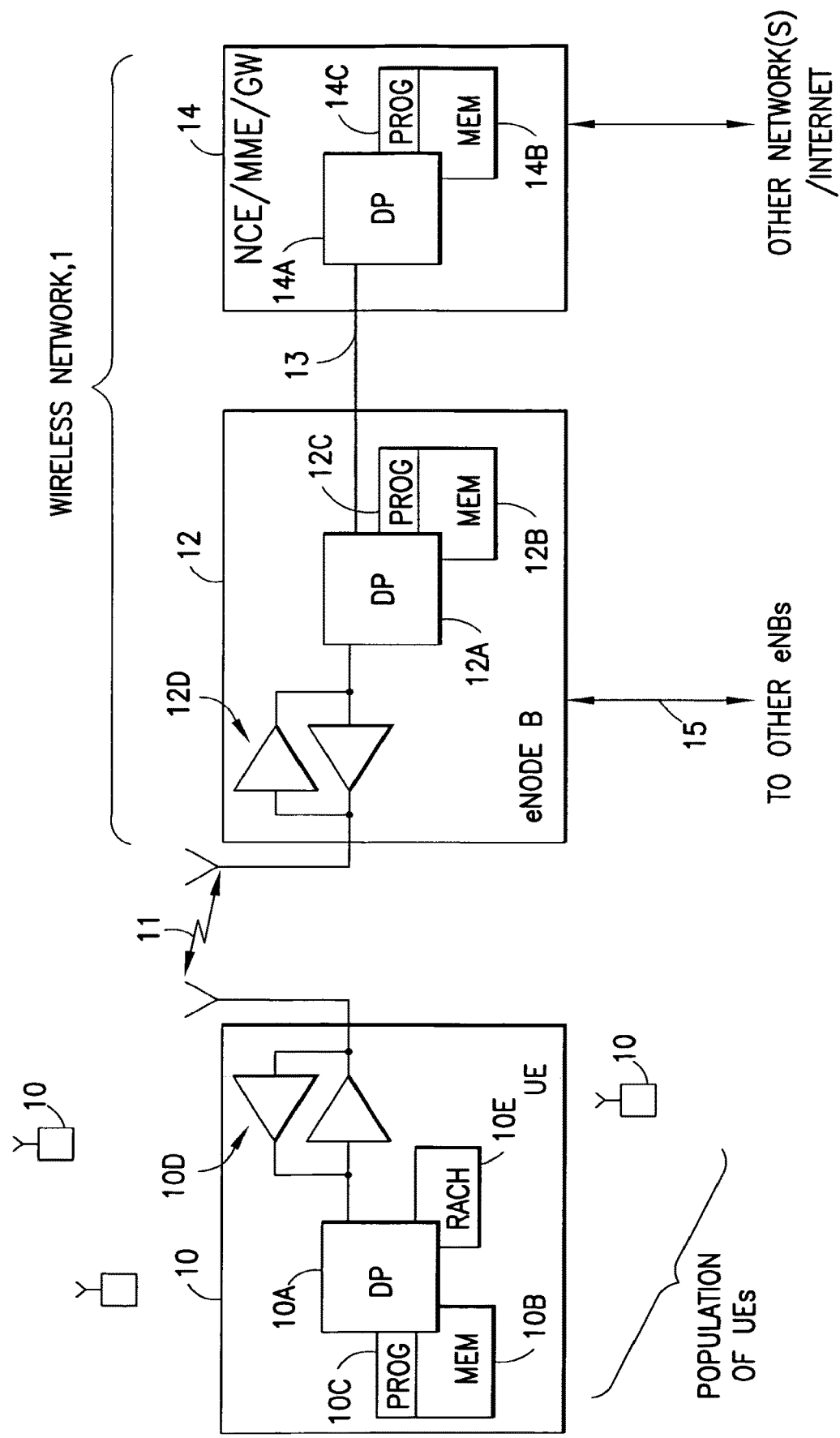
FIG. 2A shows a simplified block diagram of various electronic devices that are suitable for use in practicing the exemplary embodiments of this invention.

Before describing in further detail the exemplary embodiments of this invention, reference is made to FIG. 2A for illustrating a simplified block diagram of various electronic devices and apparatus that are suitable for use in practicing the exemplary embodiments of this invention. In FIG. 2A a wireless network 1 is adapted for communication over a wireless link 11 with an apparatus, such as a mobile communication device which may be referred to as a UE 10, via a network access node, such as a Node B (base station), and more specifically an eNB 12. The network 1 may include a network control element (NCE) 14 that may include the MME/SGW functionality shown in FIG. 1A, and which provides connectivity with a network 1, such as a telephone network and/or a data communications network (e.g., the internet). The UE 10 includes a controller, such as a computer or a data processor (DP) 10A, a computer-readable memory medium embodied as a memory (MEM) 10B that stores a program of computer instructions (PROG) 10C, and a suitable radio frequency (RF) transceiver 10D for bidirectional wireless communications with the eNB 12 via one or more antennas. The eNB 12 also includes a controller, such as a computer or a data processor (DP) 12A, a computer-readable memory medium embodied as a memory (MEM) 12B that stores a program of computer instructions (PROG) 12C, and a suitable RF transceiver 12D for communication with the UE 10 via one or more antennas. The eNB 12 is coupled via a data/control path 13 to the NCE 14. The path 13 may be implemented as the S1 interface shown in FIG. 1A. The eNB 12 may also be coupled to another eNB via data/control path 15, which may be implemented as the X2 interface shown in FIG. 1A.

At least one of the PROGs 10C and 12C is assumed to include program instructions that, when executed by the associated DP, enable the device to operate in accordance with the exemplary embodiments of this invention, as will be discussed below in greater detail.

That is, the exemplary embodiments of this invention may be implemented at least in part by computer software executable by the DP 10A of the UE 10 and/or by the DP 12A of the eNB 12, or by hardware, or by a combination of software and hardware (and firmware).

For the purposes of describing the exemplary embodiments of this invention the UE 10 may be assumed to also include a RACH function or module 10E, and the eNB 12 also includes a corresponding RACH function or module 12E, both of which are configured for operation in accordance with the exemplary embodiments of this invention.

The UE 10 may be a Rel-8 compatible UE, or a later than Rel-8 UE, such as a Rel-9 or an LTE-A compatible UE. In general, there will be some population of UEs 10 served by the eNB 12, and the population may be mixed between UEs operating as Rel-8, Rel-9 and LTE-A UEs, as non-limiting examples.

In general, the various embodiments of the UE 10 can include, but are not limited to, cellular telephones, personal digital assistants (PDAs) having wireless communication capabilities, portable computers having wireless communication capabilities, image capture devices such as digital cameras having wireless communication capabilities, gaming devices having wireless communication capabilities, music storage and playback appliances having wireless communication capabilities, Internet appliances permitting wireless Internet access and browsing, as well as portable units or terminals that incorporate combinations of such functions.

The computer readable MEMs 10B and 12B may be of any type suitable to the local technical environment and may be implemented using any suitable data storage technology, such as semiconductor based memory devices, flash memory, magnetic memory devices and systems, optical memory devices and systems, fixed memory and removable memory. The DPs 10A and 12A may be of any type suitable to the local technical environment, and may include one or more of general purpose computers, special purpose computers, microprocessors, digital signal processors (DSPs) and processors based on multi-core processor architectures, as non-limiting examples.

Figure 2B:
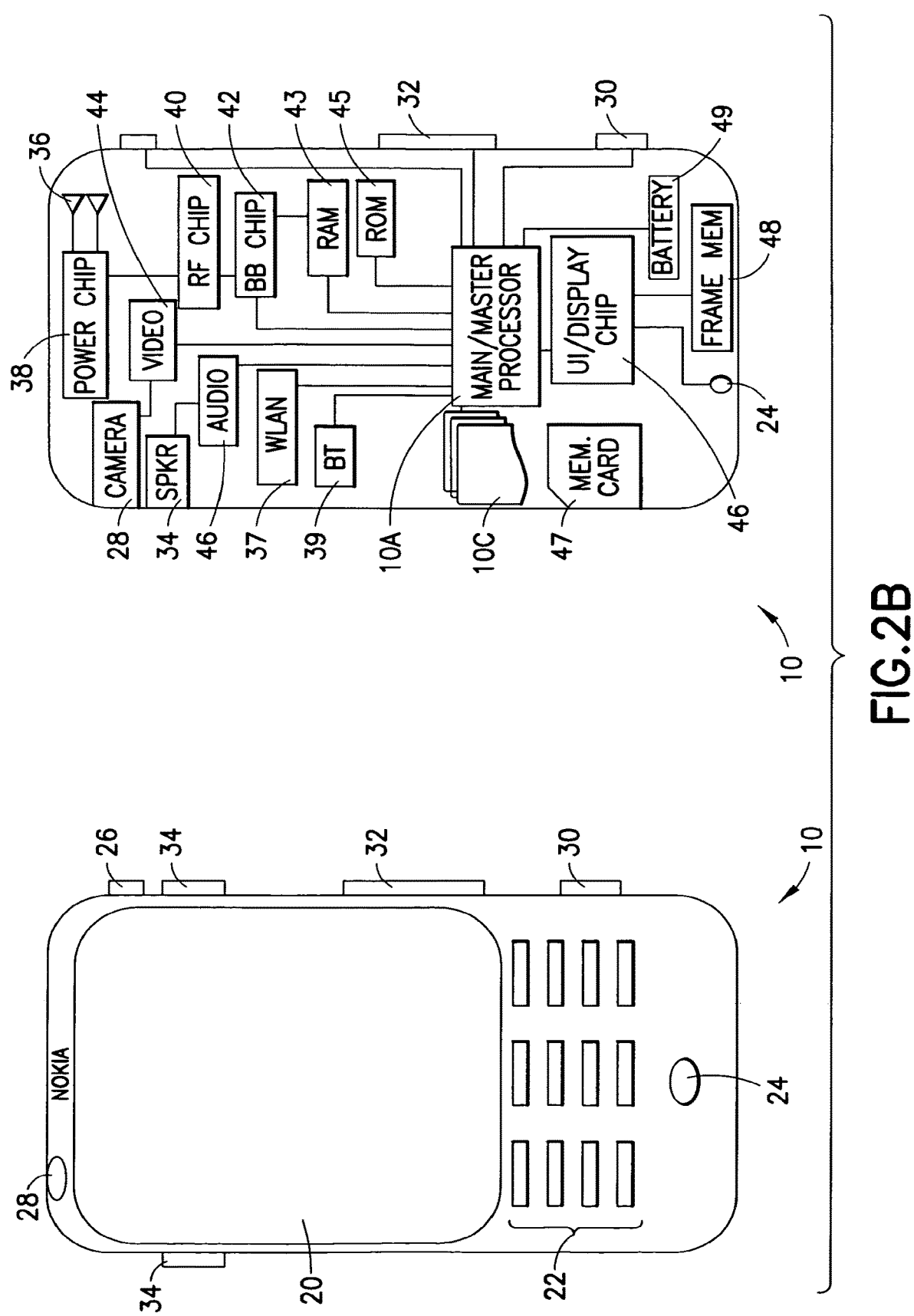
FIG. 2B shows a more particularized block diagram of a UE such as that shown at FIG. 2A.

FIG. 2B illustrates further detail of an exemplary UE 10 in both plan view (left) and sectional view (right), and the invention may be embodied in one or some combination of those more function-specific components. At FIG. 2B the UE 10 has a graphical display interface 20 and a user interface 22 illustrated as a keypad but understood as also encompassing touchscreen technology at the graphical display interface 20 and voice recognition technology received at the microphone 24. A power actuator 26 controls the device being turned on and off by the user. The exemplary UE 10 may have a camera 28 which is shown as being forward facing (e.g., for video calls) but may alternatively or additionally be rearward facing (e.g., for capturing images and video for local storage). The camera 28 is controlled by a shutter actuator 30 and optionally by a zoom actuator 30 which may alternatively function as a volume adjustment for the speaker(s) 34 when the camera 28 is not in an active mode.

Within the sectional view of FIG. 2B are seen multiple transmit/receive antennas 36 that are typically used for cellular communication. The antennas 36 may be multi-band for use with other radios in the UE. The operable ground plane for the antennas 36 is shown by shading as spanning the entire space enclosed by the UE housing though in some embodiments the ground plane may be limited to a smaller area, such as disposed on a printed wiring board on which the power chip 38 is formed. The power chip 38 controls power amplification on the channels being transmitted and/or across the antennas that transmit simultaneously where spatial diversity is used, and amplifies the received signals. The power chip 38 outputs the amplified received signal to the radio frequency (RF) chip 40 which demodulates and downconverts the signal for baseband processing. The baseband (BB) chip 42 detects the signal which is then converted to a bit stream and finally decoded. Similar processing occurs in reverse for signals generated in the apparatus 10 and transmitted from it.

Signals going to and from the camera 28 pass through an image/video processor 44 that encodes and decodes various image frames. A separate audio processor 46 may also be present controlling signals to and from the speakers 34 and the microphone 24. The graphical display interface 20 is refreshed from a frame memory 48 as controlled by a user interface chip 50 which may process signals to and from the display interface 20 and/or additionally process user inputs from the keypad 22 and elsewhere.

Certain embodiments of the UE 10 may also include one or more secondary radios such as a wireless local area network radio WLAN 37 and a Bluetooth radio 39, which may incorporate an antenna on-chip or be coupled to an off-chip antenna. Throughout the apparatus are various memories such as random access memory RAM 43, read only memory ROM 45, and in some embodiments removable memory such as the illustrated memory card 47 on which the various programs 10C are stored. All of these components within the UE 10 are normally powered by a portable power supply such as a battery 49.

The processors 38, 40, 42, 44, 46, 50, if embodied as separate entities in a UE 10 or eNB 12, may operate in a slave relationship to the main processor 10A, 12A, which may then be in a master relationship to them. Embodiments of this invention may be localized, or they may be embodied across various chips and memories as shown, or disposed within another processor that combines some of the functions described above for FIG. 2B. Any or all of these various processors of FIG. 2B access one or more of the various memories, which may be on-chip with the processor or separate from the processor. Similar function-specific components that are directed toward communications over a network broader than a piconet (e.g., components 36, 38, 40, 42, 45 and 47) may also be disposed in exemplary embodiments of the access node 12, which may have an array of tower-mounted antennas rather than the two shown at FIG. 2B.

Note that the various integrated circuits (e.g., chips 38, 40, 42, etc.) that were described above may be combined into a fewer number than described and, in a most compact case, may all be embodied physically within a single chip.

Describing now in further detail the exemplary embodiments of this invention, there is provided a method, computer program and apparatus configured to enable bundling of RA preamble responses that are sent for preambles observed in different time and frequency resources and on different component carriers such that the bundled preamble response is sent on one component carrier. This minimizes the use of PDCCH resources, and may as well beneficially reduce the UE 10 receiver complexity and access procedure delay. As was noted above, a PDCCH resource may instead be needed either for each preamble or group of preambles sent on each carrier component. In accordance with the exemplary embodiments of this invention the eNB 12 is able to respond to RACH requests on different carrier components and combine the message 2 response on a DL resource of a single carrier. This enables the UE 10 RACH 10E decoder operation to be simplified; for example only on one carrier frequency may be needed.

More specifically, after transmitting a preamble on a CC the UE 10 receives the Random Access response on a PDSCH of a CC. There are a number of ways to define which CC is used by the RACH function 12E of the eNB 12 for sending the RA preamble response. Several non-limiting examples include:

A) The CC may be freely selected by the eNB 12 from the set of CCs which the UE 10 is monitoring. This gives full flexibility to the eNB 12, but at the expense UE 10 receiver simplification, as the UE 10 should monitor all alternative DL slots within the specified time window until a matching preamble response is found.

B) A pre-defined rule known to both the eNB 12 and to at least some of the UEs 10 may be used to define the CC. To minimize the request-response delay, one exemplary rule uses the CC which has the first suitable DL slot (as the UE 10 is aware of the UL/DL configurations of all the CCs). For a case where the first suitable downlink slot occurs on multiple CCs at the same time, another rule (e.g., use the highest frequency subcarrier from the set of available subcarriers) is used to unambiguously specify which CC is being used for the preamble response.

C) Another technique is to use explicit signaling. This can be common signaling, e.g., in the form of system information (SI) which may be included in the same system information block (SIB) with the RACH parameters, to signal the preferred CC or CCs for RA preamble responses. Another approach to explicit signaling is for the UE 10 to specify in the UL request on which CC it expects to receive the response. While attractive at least for its simplicity from the UE 10 perspective, this approach may not be the most optimum at least for the reason that the RACH resource space is limited, and the UE 10 has no information concerning the DL load situation of different CCs (in other words, it may be more preferable that the eNB 12 select the CC in which to respond).

Each response may include an indication of the CC on which the preamble was received, the sequence, frequency and subframe index, a timing advance (TA) command and the UL grant, and multiple ones of these responses are bundled in the same response message that is assigned with a RA-RNTI. The RA-RNTI can be, for example, any RA-RNTI reserved for assigning PDSCH resources for preamble responses. This is true at least for the reason that (for LTE-A UEs 10) the PRACH resource (CC, frequency within the CC and subframe) of the observed preamble are given explicitly in the response, as opposed to being indicated by the RA-RNTI as in the case of Rel-8/9 UEs 10).

Responses for Rel-8/9 UEs and LTE-A UEs can be bundled into the same message. In order to maintain backwards compatibility with Rel-8/9 UEs 10 the responses sent to the LTE-A UEs 10 may be inserted into that part of the response message that Rel-8/9 UEs expect to see as padding (and which they may simply just ignore). If there are only responses to LTE-A UEs 10 to be sent, a special RA-RNTI may be used for indicating this. Another exemplary embodiment inserts a byte of backoff (BO) control information (e.g., one with a BO value equal to 0, meaning no effect, and extension flag=0) in the beginning of the response message for indicating to Rel-8/9 UEs 10 that there are no responses for them.

Figure 6:
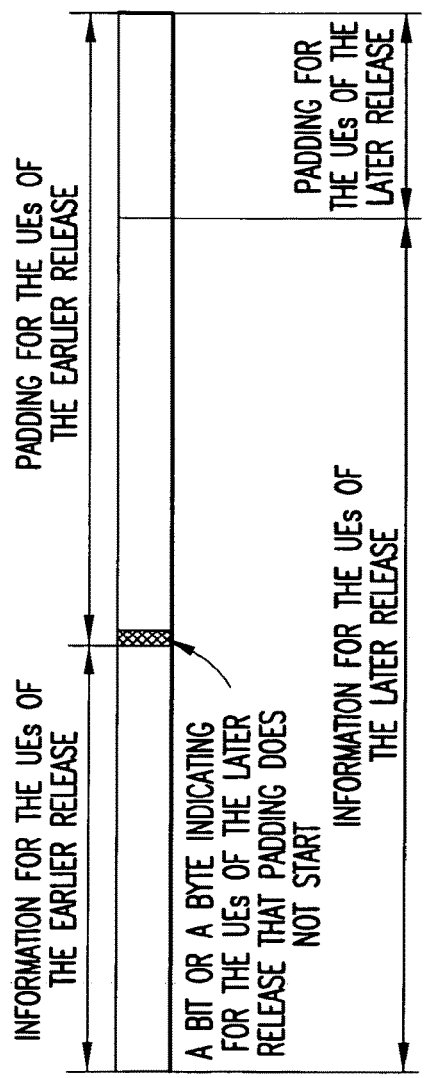
FIG. 6 shows one exemplary embodiment of a signaling scheme to provide additional information for those UEs 10 of a later release that is sent in a portion of a message that the UEs 10 of an earlier release regard as padding.

Reference can be made to FIG. 6, which shows one exemplary embodiment of a signaling scheme to provide additional information for those UEs 10 of a later release (e.g., LTE-A) that is sent in the portion of the message that the UEs 10 of an earlier release (e.g., Rel-8 or Rel-9) regard as padding. Note the use of a bit or byte to specify to the later release UEs that the padding does not begin at the indicated location, but instead that what is contained are one or more RA responses for later release UEs 10.

In another exemplary embodiment of this invention the continuation of the message is indicated to the UEs 10 of the later release by utilizing one or more bits marked as reserved bits in the specification of the earlier release. For instance, there are two reserved bits, indicated with "R" in the E/T/R/R/BI header of the random access response MAC PDU (see FIG. 6.1.5-2 of 3GPP TS 36.321 V8.5.0). One of these bits, or a combination of bit values, may be used to indicate to a UE 10 of the later release that there may be a response for it in the message portion regarded as padding by the UEs 10 of the earlier release. Typically a UE 10 would not examine or consider any bit or bits indicated as being reserved in a message, and thus backwards compatibility with the earlier release UEs 10 is maintained. It should be noted that this embodiment does not require that the random access requests are sent on different component carriers, i.e., this embodiment can be applied also in the simple case where there is only one component carrier. Then the random access request (preamble) is sent in one of the resources allocated for RACH and the response is received as in Rel-8. But depending on the case the response message may contain either a) response(s) in Rel-8 format, or b) responses in both Rel-8 and LTE-A formats, or c) response(s) only in LTE-A format. For case a) nothing new is needed. For case b) the approach of FIG. 9A can be used, and for case c) the approach of FIG. 9B can be used.

The RAR for LTE-A may be different from Rel-8 due to several reasons. One reason is already mentioned: if responses for multiple RACH resources or component carriers are included, then the RAR needs to contain the RACH resource index and the component carrier index. Also, the resource allocation for the LTE-A UEs may be different from the resource allocation for Rel-8/9 UEs, e.g., if the allocation is for a different component carrier than the one where the allocation is sent.

The foregoing description assumes that the eNB 12 has knowledge of the capability (release level) of the UE 10 that has sent a preamble. This implies that Rel-8/9 and LTE-A UEs use different parameters (e.g., one or more of sequences or frequency or time resources). If instead the same preamble resources are shared between Rel-8/9 and LTE-A UEs 10, the exemplary embodiments of this invention may still be utilized for the bundling of responses to dedicated preambles since the eNB 12 knows the capability of a UE 10 when it orders the UE 10 to begin a non-contention based random access. In general, it may be the case that more than 50% of the RACH load may typically be the result of transmission of dedicated preambles for adjusting timing of RRC-connected UEs due to handovers and DL data arrivals.

A non-limiting example is now provided as to the operation of the exemplary embodiments of this invention for a TDD non-contiguous carrier system. In that it may be assumed that the lower frequency band has better coverage than the higher frequency band (e.g., see FIG. 3, FIG. 4), one advantageous implementation uses more DL subframes in the lower frequency band. For example, assume that a particular UE 10 has 900 MHz and 2 GHz carrier components, and on the 900 MHz component the UE 10 uses U/D configuration 4, and on the 2 GHz component the UE 10 uses configuration 0 (see again FIG. 1B, which shows the uplink-downlink configurations specified in 3GPP TS 36.211 V8.5.0). The UE 10 may select randomly on which CC to transmit the RACH transmission (or re-transmission) if the lower frequency carries a heavy RACH load. By assuming that at least one low frequency component carrier is common for all CCs of the UEs, the UE 10 monitoring all RACH responses of the CC and within the maximum time response window 10 ms of each UL/DL configuration of each CC, a RA-RNTI is reserved at the common or default component carrier for all UEs.

Figure 7:
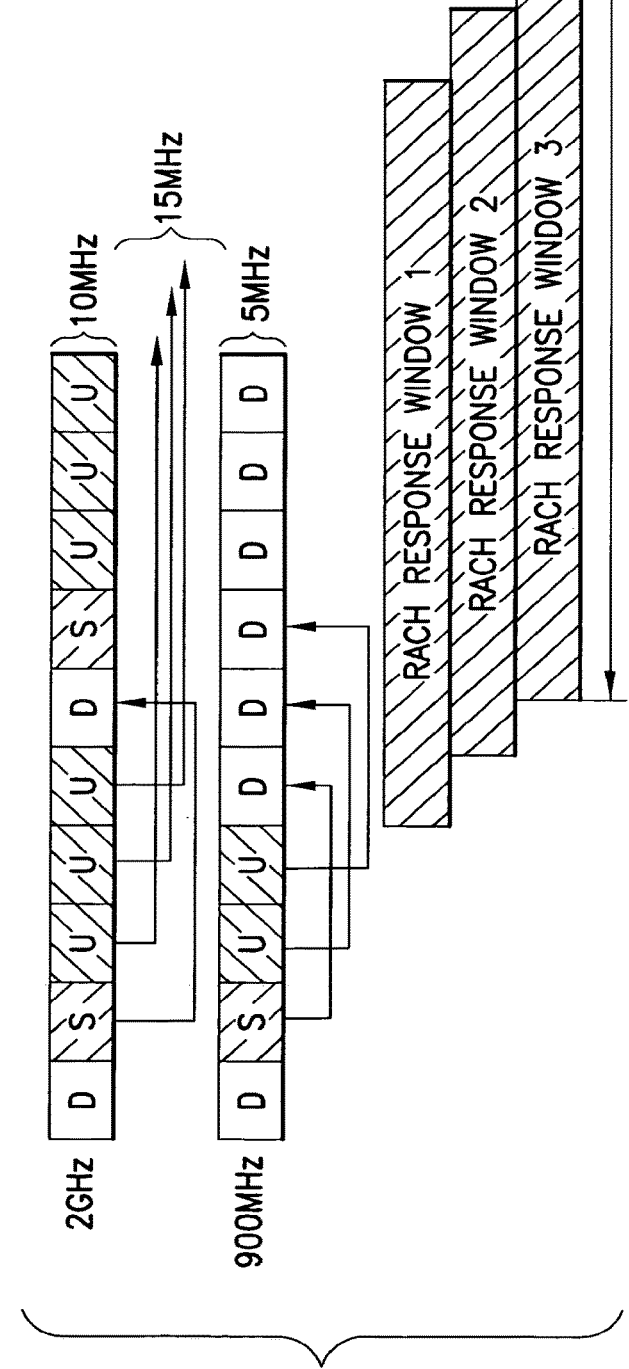
FIG. 7 shows an example of PRACH response for the non-contiguous carrier network.
Figure 8:
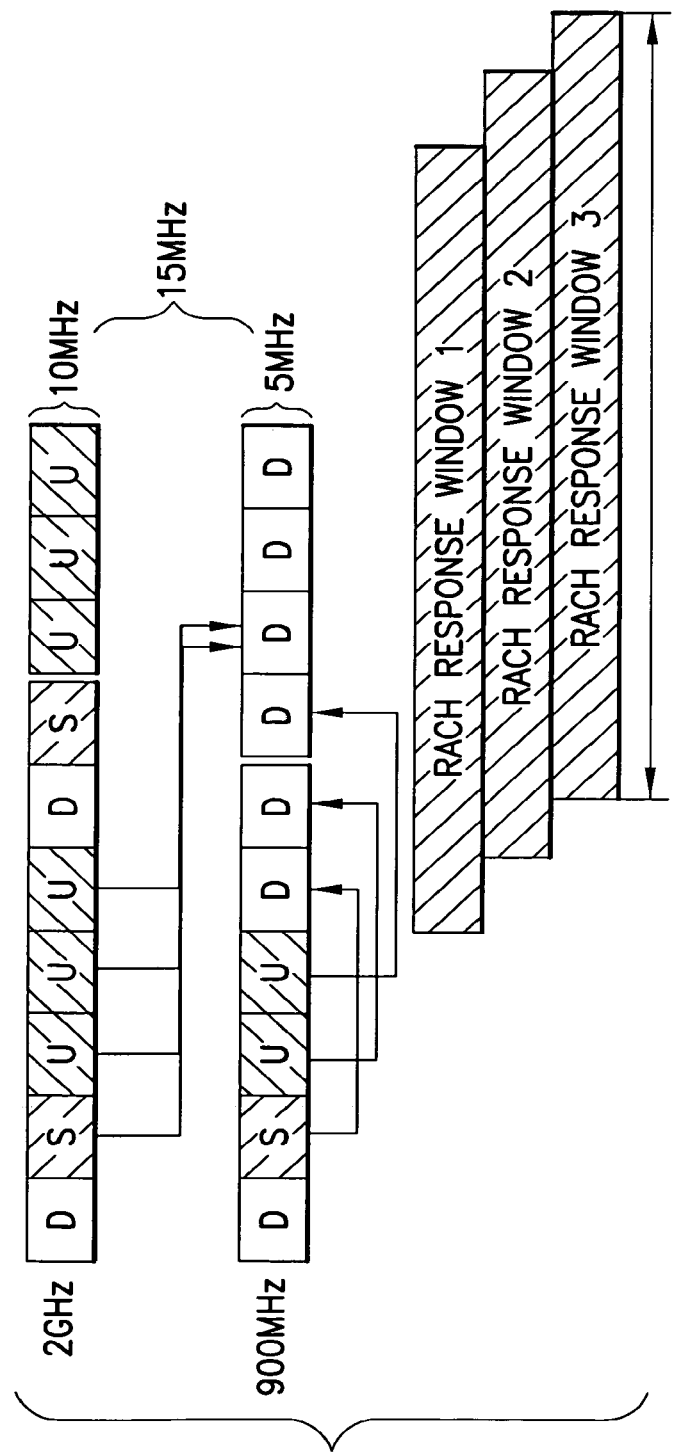
FIG. 8 shows an example of PRACH response for the non-contiguous carrier network in accordance with the exemplary embodiments of this invention.

As previously considered the same preamble is assigned to each CC of the UE 10, and at least one RA-RNTI is reserved for each CC. However, in accordance with the exemplary embodiments of this invention, only one RA-RNTI is used for all CCs. FIG. 7 illustrates a conventional approach in the response of the RA-RNTI to PRACHs in UpPTS or an UL subframe in a non-contiguous CC system, while FIG. 8 illustrates the operation of the exemplary embodiments of this invention.

In a case where there are fewer DL subframes in the UL/DL frame configuration on one UE 10 CC, e.g., for configurations 0, 1, and 6 of Table 4.2-2 3GPP TS 36.211 V8.5.0 (see again FIG. 1B herein), the responses are as show, for example, in FIG. 7, using one PDCCH resource for up to 10 PRACHs in 10 ms on each CC. However, by using the bundled response approach in accordance with the exemplary embodiments of this invention over different CCs on message 2 in responses to PRACHs PDCCH resources are conserved, and response latencies are deduced, as shown in FIG. 8.

On the UE side, when one preamble is sent on one CC of the UE 10 it automatically searches for the PDCCH within its response window, but on the lower frequency or the default component carrier. The response window is at most 10 ms long, and it begins 2 ms after the UL subframe in which the RA preamble was transmitted. The UE 10 searches for the response on the lower frequency carrier for the PDCCH and the corresponding response message on the PDSCH.

Figure 9:
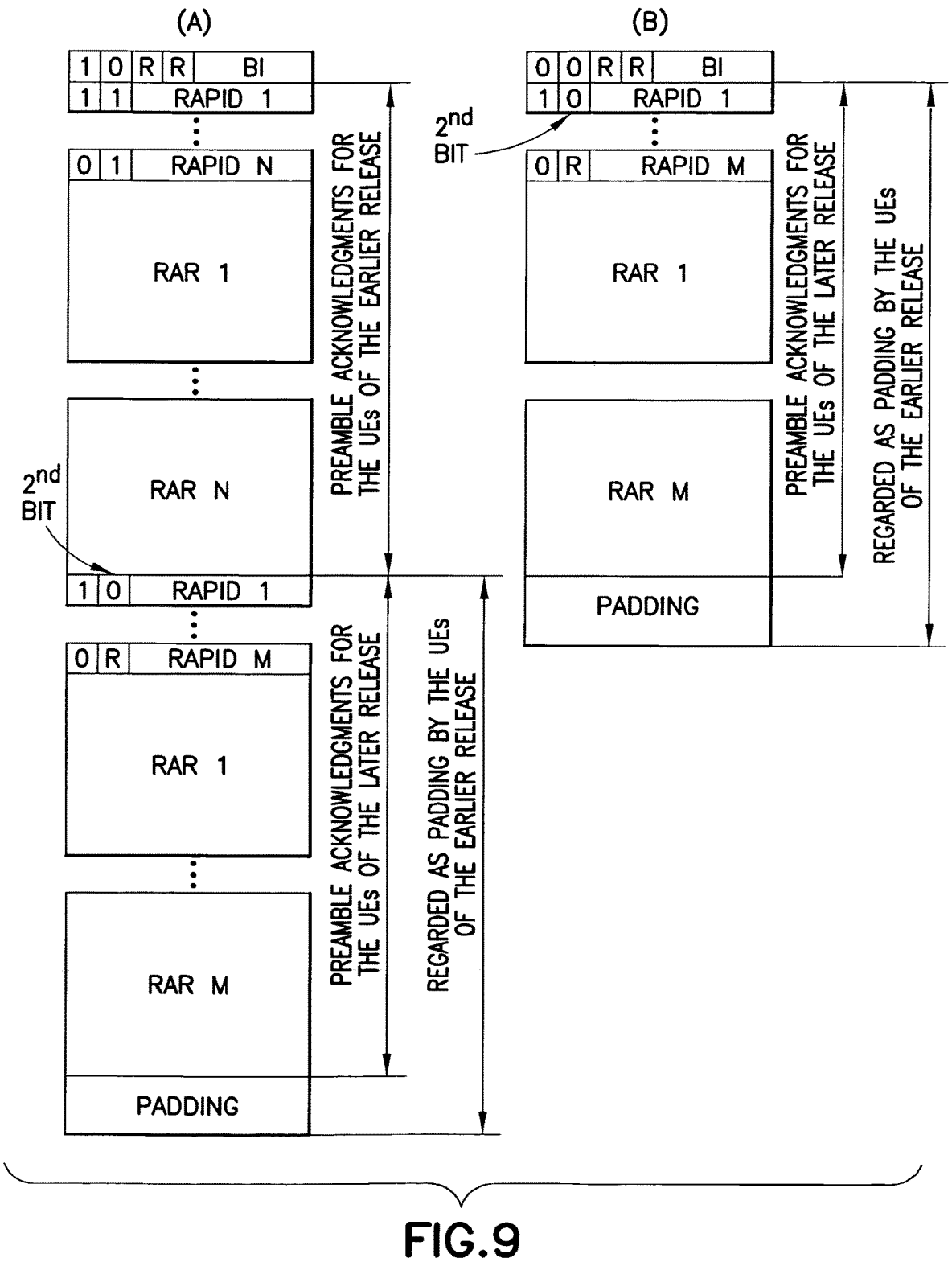
FIG. 9 depicts two exemplary embodiments (labeled A and B for convenience) of the merging of preamble responses for UEs of differing capabilities in accordance with the exemplary embodiments of this invention.

FIG. 9 shows the merging of the preamble responses for UEs 10 of different capability in accordance with exemplary aspects of this invention.

Figure 1F:
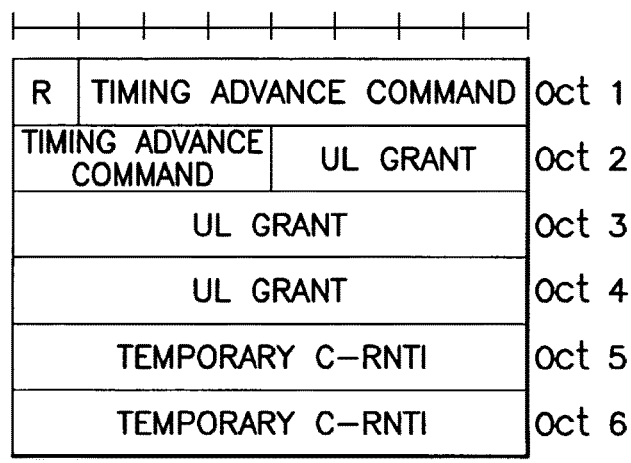
Figure 1G:
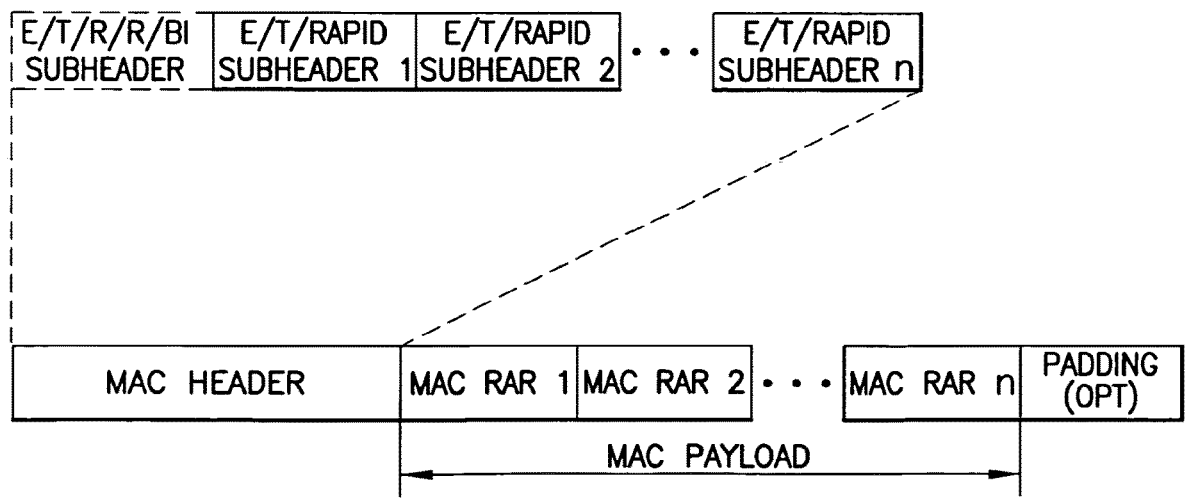

By way of clarification, reference may be made to 3GPP TS 36.321 V 8.5.0, subclause 6.1.5: MAC PDU (Random Access Response), and to FIGS. 1D-1G, which reproduce FIGS. 6.1.5-1 through 6.1.5-4 of 3GPP TS 36.321 V 8.5.0. A MAC PDU is said to consist of a MAC header and one or more MAC Random Access Responses (MAC RAR) and optionally padding as described in FIG. 1F. The MAC header is of variable size. A MAC PDU header consists of one or more MAC PDU subheaders; each subheader corresponding to a MAC RAR except for the Backoff Indicator subheader. If included, the Backoff Indicator subheader is only included once, and is the first subheader included within the MAC PDU header. A MAC PDU subheader consists of the three header fields E/T/RAPID (as described in FIG. ID), but for the Backoff Indicator subheader which consists of the five header field E/T/R/R/BI (as described in FIG. 1 E). A MAC RAR consists of the four fields R/Timing Advance Command/UL Grant/Temporary C-RNTI (as described in FIG. 1F). Padding may occur after the last MAC RAR. The presence and length of the padding is implicit based on TB size, size of MAC header and number of RARs. FIG. 1G depicts an example of a MAC PDU containing a MAC header and MAC RARs.

Returning to FIG. 9, assume that both earlier release (e.g., Rel-8) and later release (e.g., LTE-A) UEs read the backoff indicator (BI) sent in the first byte. In the first example (A) the preamble acknowledgements are sent for the UEs of both the earlier and the later releases. The acknowledgements for the UEs of the later release are in that part of the message that the UEs 10 of the earlier release regard as padding (see again FIG. 6). As an example, a value of 0 in the second bit of padding portion is used to indicate to the UEs of the later release that there may be preamble acknowledgements for them in the remainder of the message. In the example (B), preamble acknowledgements are sent only for the UEs of the later release (note again the value of 0 in the second bit of the padding).

There are a number of advantages and technical effects that may be realized by the use of the exemplary embodiments of this invention. For example, there can be realized a saving of PDCCH resources on different CCs, as well as reduction in the complexity of the UE 10 receiver operation during the reception of the RACH response. This implies that UE 10 receiver operation on 2-5 different RF carriers is not necessary. Further by example, there are reduced constraints on resource allocation, as well as potentially a reduced delay due to a high density of PRACH messages associated with limited PDCCH resources on some component carriers.

Note that later release UEs 10, such as LTE-A UEs, may use a different preamble group set than earlier release, e.g., Rel-8/9, UEs to distinguish themselves to the eNB 12.

The exemplary embodiments of this invention may also be used in the FDD system, when there are one or several PRACH time resources per 10 ms and per component carrier. Bundling of responses to preambles that have been observed at different CCs can save PDCCH resources without introducing any additional delay.

One specific and non-limiting advantage and technical effect that is gained by the use of these exemplary embodiments is an ability to bundle or aggregate in a single DL CC RA responses to RA preambles received from a population of UEs on a plurality of UL CCs.

Figure 10:
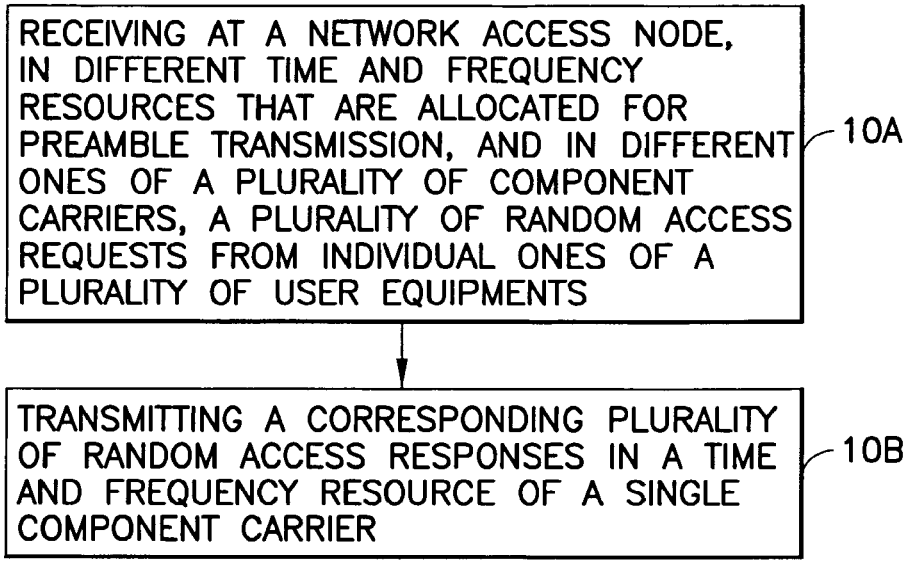
FIGS. 10, 11 and 12 are each a logic flow diagram that illustrates the operation of methods, and a result of execution of computer program instructions embodied on a computer readable memory, in accordance with the exemplary embodiments of this invention.

Referring to FIG. 10, based on the foregoing it should be apparent that the exemplary embodiments of this invention provide a method, and computer program instructions stored in a computer-readable medium, to perform steps and operations of (Block 10A) receiving at a network access node, in different time and frequency resources that are allocated for preamble transmission, and in different ones of a plurality of component carriers, a plurality of random access requests from individual ones of a plurality of user equipments; and (Block 10B) transmitting a message comprising a corresponding plurality of random access responses in a time and frequency resource of a single component carrier.

Note that the time and frequency resources that are allocated for preamble transmission may be considered to be those wherein the UE 10 is permitted or allowed to transmit the random access preamble. Note further, however, that at least in Rel-8 the eNB 12 may schedule a UE to transmit normal data using those time and frequency resources. Thus, while the time and frequency resources may be allocated for RACH, another (different) use may also be permitted.

The method and the computer program instructions as above, where the plurality of random access responses are transmitted on a physical downlink shared channel.

The method and the computer program instructions as above, where the single component carrier is selected freely by the network access node from a set of component carriers.

The method and the computer program instructions as above, where the single component carrier is selected by the network access node in accordance with at least one rule.

The method and the computer program instructions as above, where the at least one rule comprises selecting the single component carrier as being one having a first available downlink slot and, for a case where more than one of the component carriers each simultaneously contain an available downlink slot, selecting as the single component carrier the component carrier having the highest frequency subcarrier.

The method and the computer program instructions as above, where the single component carrier is specified by the use of explicit signaling.

The method and the computer program instructions as above, where the explicit signaling comprises use of system information transmitted from the network access node.

The method and the computer program instructions as above, where the corresponding plurality of random access responses are for a first type of user equipment and for a second type of user equipment, and where there is at least one random access response for one of the second type of user equipment that is placed in a message at a location that need not be read by the first type of user equipment.

The method and the computer program instructions as above, where the message comprises an indicator that is set for indicating that the message contains the at least one random access response for one of the second type of user equipment.

The method and the computer program instructions as above, where the location that need not be read by the first type of user equipment is in a message padding portion, and where the indicator is also in the message padding portion.

The exemplary embodiments of this invention also pertain to an apparatus that comprises a controller configured to operate with a wireless receiver and a wireless transmitter, where the controller is further configured respond to a reception in different time and frequency resources allocated for preamble transmission, and in different ones of a plurality of component carriers, a plurality of random access requests from individual ones of a plurality of user equipments and to transmit a corresponding plurality of random access responses in a time and frequency resource of a single component carrier.

The exemplary embodiments of this invention also pertain to an apparatus that comprises means for receiving at a network access node, in different time and frequency resources allocated for preamble transmission, and in different ones of a plurality of component carriers, a plurality of random access requests from individual ones of a plurality of user equipments; and means for transmitting a corresponding plurality of random access responses in a time and frequency resource of a single component carrier.

Figure 11:
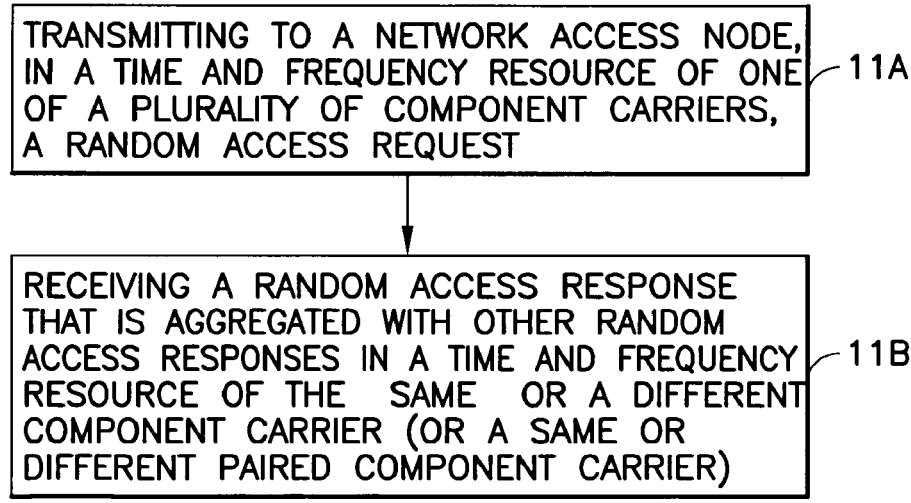

Referring to FIG. 11, based on the foregoing it should be apparent that the exemplary embodiments of this invention provide a method, and computer program instructions stored in a computer-readable medium, to perform steps and operations of (Block 11A) transmitting to a network access node, in a time and frequency resource of one of a plurality of component carriers, a random access request; and (Block 11B) receiving a message comprising a random access response that is aggregated with other random access responses in a time and frequency resource of the same or a different component carrier (or a same or different paired component carrier for the FDD case).

Figure 12:
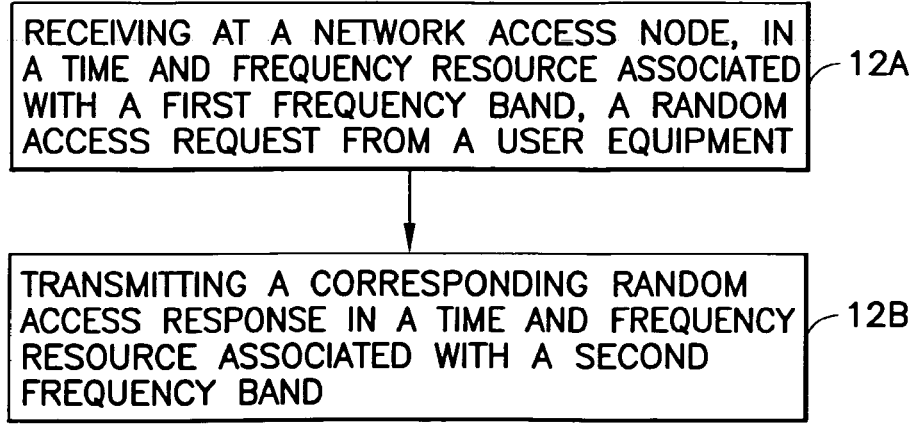

Referring to FIG. 12, based on the foregoing it should be apparent that the exemplary embodiments of this invention also provide a method, and computer program instructions stored in a computer-readable medium, to perform steps and operations of (Block 12A) receiving at a network access node, in a time and frequency resource associated with a first frequency band, a random access request from a user equipment; and (Block 12B) transmitting a corresponding random access response in a time and frequency resource associated with a second frequency band.

The various blocks shown in FIGS. 10, 11 and 12 may be viewed as method steps, and/or as operations that result from operation of computer program code, and/or as a plurality of coupled logic circuit elements constructed to carry out the associated function(s), such as the functions of the RACH module 12E or RACH module 10E, respectively, of FIG. 2A.

The exemplary embodiments of this invention also pertain to an apparatus that comprises a controller configured to operate with a wireless receiver and a wireless transmitter, where the controller is further configured to transmit to a network access node, in a time and frequency resource reserved for preamble transmission, of one of a plurality of component carriers, a random access request, and to receive a random access response that is aggregated with other random access responses in a time and frequency resource of the same or a different component carrier.

The exemplary embodiments of this invention also pertain to an apparatus that comprises means for transmitting to a network access node, in a time and frequency resource of one of a plurality of component carriers, a random access request; and for receiving a random access response that is aggregated with other random access responses in a time and frequency resource of the same or a different component carrier, or in a paired component carrier.

The exemplary embodiments of this invention also pertain to an apparatus that comprises means for transmitting to a network access node, in a time and frequency resource of one of a plurality of component carriers, a random access request; and for receiving a random access response in a time and frequency resource of a different component carrier.

In general, the various exemplary embodiments may be implemented in hardware or special purpose circuits, software, logic or any combination thereof. For example, some aspects may be implemented in hardware, while other aspects may be implemented in firmware or software which may be executed by a controller, microprocessor or other computing device, although the invention is not limited thereto. While various aspects of the exemplary embodiments of this invention may be illustrated and described as block diagrams, flow charts, or using some other pictorial representation, it is well understood that these blocks, apparatus, systems, techniques or methods described herein may be implemented in, as non-limiting examples, hardware, software, firmware, special purpose circuits or logic, general purpose hardware or controller or other computing devices, or some combination thereof.

It should thus be appreciated that at least some aspects of the exemplary embodiments of the inventions may be practiced in various components such as integrated circuit chips and modules, and that the exemplary embodiments of this invention may be realized in an apparatus that is embodied as an integrated circuit. The integrated circuit, or circuits, may comprise circuitry (as well as possibly firmware) for embodying at least one or more of a data processor or data processors, a digital signal processor or processors, baseband circuitry and radio frequency circuitry that are configurable so as to operate in accordance with the exemplary embodiments of this invention.

Various modifications and adaptations to the foregoing exemplary embodiments of this invention may become apparent to those skilled in the relevant arts in view of the foregoing description, when read in conjunction with the accompanying drawings. However, any and all modifications will still fall within the scope of the non-limiting and exemplary embodiments of this invention.

It should be noted that the terms "connected," "coupled," or any variant thereof, mean any connection or coupling, either direct or indirect, between two or more elements, and may encompass the presence of one or more intermediate elements between two elements that are "connected" or "coupled" together. The coupling or connection between the elements can be physical, logical, or a combination thereof. As employed herein two elements may be considered to be "connected" or "coupled" together by the use of one or more wires, cables and/or printed electrical connections, as well as by the use of electromagnetic energy, such as electromagnetic energy having wavelengths in the radio frequency region, the microwave region and the optical (both visible and invisible) region, as several non-limiting and non-exhaustive examples.

Further, the various names used for the described parameters (e.g., RA-RNTI) are not intended to be limiting in any respect, as these parameters may be identified by any suitable names. Further, any formulas and expressions that use these various parameters may differ from those expressly disclosed herein. Further, the various names assigned to different channels (e.g., PRACH, PDCCH, PDSCH, etc.) are not intended to be limiting in any respect, as these various channels may be identified by any suitable names.

Furthermore, some of the features of the various non-limiting and exemplary embodiments of this invention may be used to advantage without the corresponding use of other features. As such, the foregoing description should be considered as merely illustrative of the principles, teachings and exemplary embodiments of this invention, and not in limitation thereof.

What is claimed is:

1. A method for mobile communication using carrier aggregation, the method comprising:
   transmitting, from a user equipment to a network access node in a carrier aggregation network, a random access preamble in a time and frequency resource allocated for preamble transmission on any one of a plurality of component carriers, the plurality of component carriers comprising a primary component carrier and a plurality of secondary component carriers, the one of the plurality of secondary component carriers being selected by the user equipment;

receiving, at the user equipment, a random access response to the random access preamble, the random access response being aggregated with other random access responses in a time and frequency resource of the primary component carrier regardless of on which component carrier among the plurality of component carriers the random access preamble was transmitted, wherein the aggregated random access response comprises responses to a plurality of random access preambles from individual ones of a plurality of user equipments.

2. The method of claim 1, wherein the random access response is received on a physical downlink shared channel.

3. The method of claim 1, wherein the aggregated random access response is for a first type of user equipment and for a second type of user equipment, the aggregated random access response comprising at least one random access response for the second type of user equipment placed at a location to be ignored by the first type of user equipment, the aggregated random access response comprising an indicator for indicating whether the aggregated random access response contains the at least one random access response for the second type of user equipment.

4. An apparatus comprising:
a wireless receiver;
a wireless transmitter; and
a controller configured to utilize the wireless receiver and the wireless transmitter, the controller further configured to:
transmit, via the wireless transmitter, a random access preamble to a network access node in a time and frequency resource allocated for preamble transmission on one of a plurality of component carriers, the plurality of component carriers comprising a primary component carrier and a plurality of secondary component carriers, the one of the plurality of secondary component carriers being selected by the user equipment, the network access node being in a carrier aggregation network; and
receive, via the wireless receiver, a random access response to the random access preamble, the random access response being aggregated with other random access responses in a time and frequency resource of the primary component carrier regardless of on which component carrier among the plurality of component carriers the random access preamble was transmitted,
wherein the aggregated random access response comprises responses to a plurality of random access preambles from individual ones of a plurality of user equipments.

5. The apparatus of claim 4, wherein the random access response is received on a physical downlink shared channel.

6. The apparatus of claim 4, wherein the aggregated random access response is for a first type of user equipment and for a second type of user equipment, the aggregated random access response comprising at least one random access response for one of the second type of user equipment placed at a location to be ignored by the first type of user equipment, the aggregated random access response comprising an indicator for indicating whether the aggregated random access response contains the at least one random access response for the second type of user equipment.

7. A non-transitory computer-readable storage medium storing instructions that, when executed on a processor, cause an apparatus to perform:
transmitting, from a user equipment to a network access node in a carrier aggregation network, a random access preamble in a time and frequency resource allocated for preamble transmission on one of a plurality of component carriers, the plurality of secondary component carriers comprising a primary component carrier and plurality of secondary component carriers, the one of the plurality of secondary component carriers being selected by the user equipment; and
receiving, at the user equipment, a random access response to the random access preamble, the random access response being aggregated with other random access responses in a time and frequency resource of the primary component carrier regardless of on which component carrier among the plurality of component carriers the random access preamble was transmitted,
wherein the aggregated random access response comprises responses to a plurality of random access preambles from individual ones of a plurality of user equipments.

8. The non-transitory computer-readable storage medium of claim 7, wherein the random access response is received on a physical downlink shared channel.

9. The non-transitory computer-readable storage medium of claim 7, wherein the aggregated random access response is for a first type of user equipment and for a second type of user equipment, the aggregated random access response comprising at least one random access response for the second type of user equipment placed at a location to be ignored by the first type of user equipment, the aggregated random access response comprising an indicator for indicating whether the aggregated random access response contains the at least one random access response for the second type of user equipment.

* * * * *